United States Patent [19]

Galves et al.

[11] 4,398,118
[45] Aug. 9, 1983

[54] X-RAY IMAGE INTENSIFIER

[75] Inventors: Jean-Pierre Galves, Paris; Jean-Marie Gutierrez, Antibes, both of France

[73] Assignee: Thomson - CSF, Paris, France

[21] Appl. No.: 258,731

[22] Filed: Apr. 29, 1981

Related U.S. Application Data

[63] Continuation of Ser. No. 76,039, Sep. 17, 1979, Pat. No. 4,287,230, which is a continuation of Ser. No. 821,217, Aug. 2, 1977, abandoned.

[30] Foreign Application Priority Data

Aug. 3, 1976 [FR] France .................................. 76 23726

[51] Int. Cl.³ ................................................ H01J 1/62
[52] U.S. Cl. .................................. 313/527; 250/213 R; 250/483.1; 313/388; 427/65
[58] Field of Search ................... 313/101, 102, 94, 388; 250/483, 213 R; 427/65, 70, 255.7, 372.2, 157

[56] References Cited

U.S. PATENT DOCUMENTS

| Re. 29,956 | 3/1979 | Lightenberg et al. | 427/65 |
| 3,147,226 | 9/1964 | Jonck | 250/483 |
| 3,213,308 | 10/1965 | Feibelman | 313/380 |
| 3,296,448 | 1/1967 | Swinehart et al. | 250/483 |
| 3,769,059 | 10/1973 | Driard et al. | 250/483 |
| 3,795,531 | 3/1974 | Spicer | 427/65 |
| 3,825,787 | 7/1974 | Doolittle | 313/102 |
| 3,855,035 | 12/1974 | Bates et al. | 250/483 |
| 4,069,355 | 1/1978 | Lubowski et al. | 427/70 |
| 4,100,445 | 7/1978 | Suffredini et al. | 313/101 |

Primary Examiner—John D. Smith
Attorney, Agent, or Firm—Roland Plottel

[57] ABSTRACT

In an X-ray image intensifier consisting of a scintillator screen associated with a photocathode, an electron-optical system and an output screen on which a strong visible image appears, resolution is improved by providing the scintillator screen, formed by a layer of cesium iodide doped with sodium deposited onto the substrate, a structure of needles approximately micrometers in diameter which are kept in the form of separate needles during the subsequent heat treatment by virtue of the presence of silicon oxide in the cesium iodide lattice.

10 Claims, 6 Drawing Figures

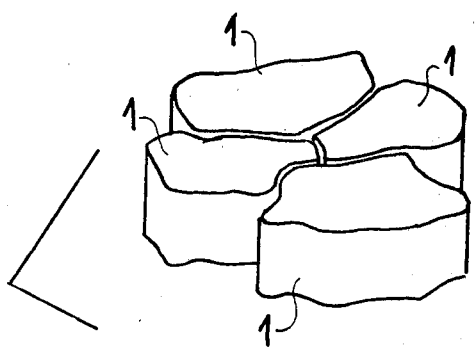
FIG_1
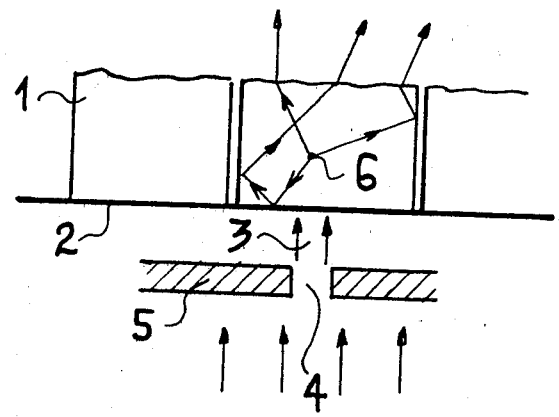
FIG_2
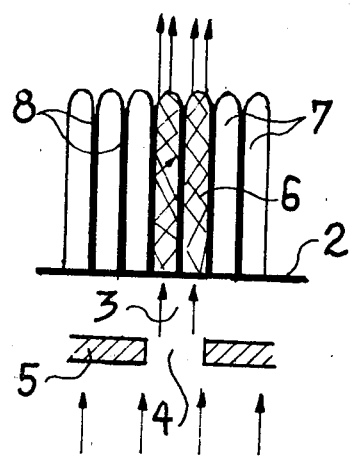
FIG_3

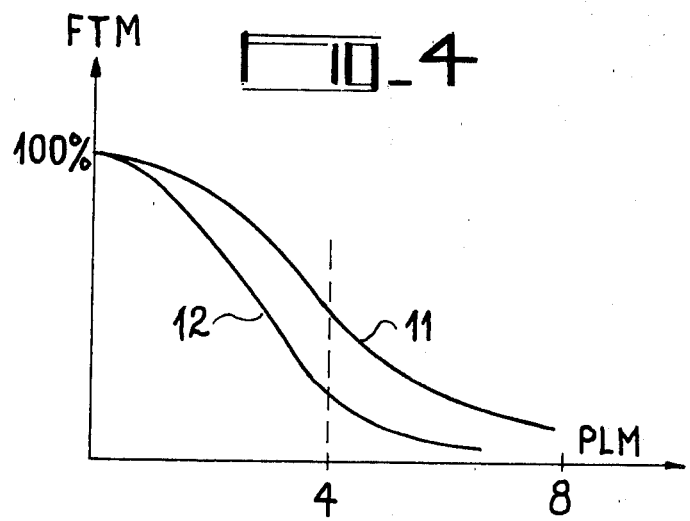
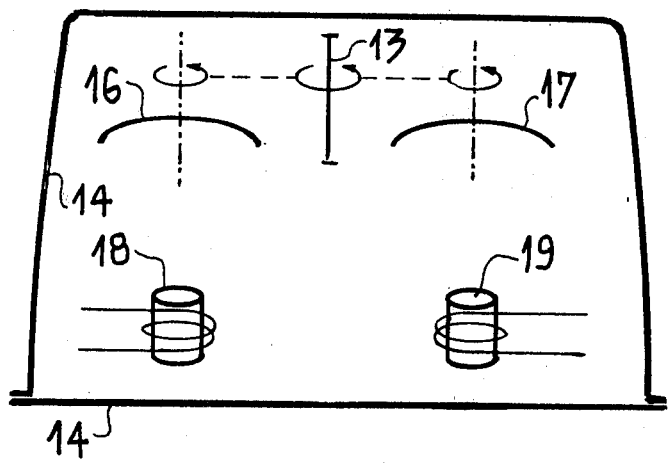
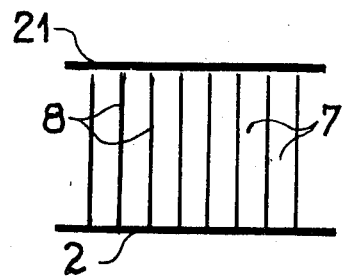

X-RAY IMAGE INTENSIFIER

CROSS-REFERENCE TO RELATED APPLICATION

This application is a continuation of application Ser. No. 76,036 filed Sept. 17, 1979 now U.S. Pat. No. 4,287,230 which is a continuation of application Ser. No. 821,217 filed Aug. 2, 1977, now abandoned.

BACKGROUND OF THE INVENTION

This invention relates to an X-ray image intensifier and to a process for its production.

X-ray image intensifiers essentially consist of an input screen, or scintillator, with which a photocathode is associated, an electron-optical system and a so-called output screen on which the image appears in visible light. The X-photons impinge on the scintillator which produces luminous photons which are in turn absorbed by the photo-cathode emitting electrons. The electrons are accelerated by the electron-optical system and impinge on the output screen where they give rise to an emission of visible light.

The input screen, or scintillator, is generally formed by a layer of cesium iodide (CSI) doped with sodium in proportions which are optimised so as to obtain maximum luminescence when the screen is subjected to excitation by X-rays.

This CSI layer has a thickness of from 150 to 200 $\mu$m selected in such a way as to obtain a compromise between, on the one hand, the X-absorption of the material, which should be as high as possible so as to ensure a maximum conversion of X-photons into luminous photons which necessitates considerable thicknesses and on the other hand the resolution of the luminescent layer, this resolution being higher, the narrower the thickness of the layer.

For a thickness of the CsI layer of 150 $\mu$m, approximately 40% of the X-photons of 60 KeV are absorbed.

This doped CsI layer is generally deposited onto an aluminium substrate in the form of a spherical cap. The processes currently used for depositing this CsI layer include:

The co-evaporation is vacuo of CsI and sodium iodide (NaI) from a single heated crucible onto the hot substrate kept at a temperature of from 200° to 250° C.;

co-evaporation by exactly the same process, but onto a cold substrate, followed by heat treatment at a temperature above 250° C.

In either case, however, the material obtained after evaporation does not have the property of luminescence under X (or UV) excitation if there has been no heat treatment during or after the evaporation step.

The structure of a layer thus obtained is far from favourable to the production of a high-resolution screen because, irrespective of whether evaporation is carried out on a hot substrate or on a cold substrate, followed by heat treatment, the temperature acts on the deposited material by intercrystalline diffusions. This results in the formation of isotropic monocrystals of fairly large dimensions (from 100 to 200 $\mu$m in the lateral directions) possibly separated by cracks which insulate them electrically and optically from one another to a greater or lesser extent.

FIG. 1 shows part of a CsI layer which has been deposited by one of the processes described above and which has been subjected to the heat treatment required for its effectiveness. It can be seen that this layer is not uniform, but instead is formed by the juxtaposition of monocrystals 1.

FIG. 2 illustrates the behaviour of such a layer under the effect of X-radiation. It is assumed that a CsI layer consisting of monocrystals 1 deposited onto a substrate 2 receives a beam 3 of X-rays coming from a narrow slot 4 formed in a screen 5 exposed to the radiation. An X-photon 6 emanating from the beam 3 is absorbed by the CsI and produces several luminous photons which emerge from the monocrystal 1 after having undergone a certain number of different reflections and refractions. Some emerge directly from the monocrystal while others undergo one or more reflections before emerging therefrom so that the incident X-ray beam, irrespective of its size, will give rise to the emission of a luminous radiation in all directions as if it were a substantially omni-directional light source equal in its dimensions to a monocrystal 1, i.e. between 100 and 200 $\mu$m. The image of the slot will thus be enlarged.

SUMMARY OF THE INVENTION

It can be seen that a structure such as this makes it impossible to obtain a high-resolution screen. For a layer thickness of 150 $\mu$m, the resolution limit obtained does not exceed 6 to 7 pairs of lines per millimeter.

In order to reduce the dimensions of the monocrystals responsible for the lateral diffusion of the luminous radiation created under X-excitation, attempts have been made artificially to create cracks in the luminescent layer by utilising the difference between the coefficients of expansion of the CsI layer and the substrate on which it is deposited. However, the regions spatially separated from one another still have excessive dimensions (approximately 60 $\mu$m) and it is difficult to obtain by this process a resolution of better than 8 pairs of lines per millimeter. In addition, the cracks thus obtained create electrically insulated islets to the detriment of the lateral electrical conductivity of the photocathode.

The present invention relates to an X-ray image intensifier which does not have any of these disadvantages.

The invention also relates to a process for producing this X-ray image intensifier.

The layer of cesium iodide is formed by needles of small diameter (3 to 8 $\mu$m) obtained by vapour condensation on a cold substrate. A foreign material is introduced into the crystal lattices of the cesium iodide to prevent the needles from coalescing into monocrystals of large dimensions during the subsequent heat treatment.

According to the invention, the X-ray image intensifier consisting of a scintillator with which a photocathode is associated, an electron-optical system and an output screen on which the visible image appears, is characterised in that the scintillator is formed by a substrate onto which a layer of cesium iodide doped with sodium is deposited, said layer having a structure of fine needles that are substantially parallel to and optically independent.

According to the invention, this result is obtained by the following steps:

alternately depositing onto the cold substrate by condensation vapours of the actual scintillator material, cesium iodide doped with sodium, and vapour of a material different from cesium iodide;

heat treating the deposit thus applied by increasing the temperature of the assembly to between 250° and 500° C.

Other features will become apparent from the following descriptions of particular embodiments and explanations in conjunction with the accompanying drawings, wherein:

BRIEF DESCRIPTION OF THE DRAWINGS

FIG. 1 is a perspective view of a layer of cesium iodide produced by one of the prior-art processes.

FIG. 2 is a section through this layer showing the path of the incident X-rays and luminous rays;

FIG. 3 is a section through a layer according to the invention showing the paths followed by the rays;

FIG. 4 shows curves representing the variations in the modulation transfer function with the spatial frequency in a layer according to the invention and in a layer corresponding to the prior art;

FIG. 5 diagrammatically illustrates an apparatus for carrying out the process according to the invention;

FIG. 6 is a section through a variant of the layer.

DESCRIPTION OF THE PREFERRED EMBODIMENTS

FIGS. 1 and 2 relate to the structure and operation of a layer corresponding to the prior art.

FIG. 3, which is a section through a layer according to the invention, shows a collection of fine needles 7 formed by monocrystals of cesium iodide doped with sodium. The width of these needles is approximately 5 $\mu$m. FIG. 3 shows the path followed by the luminous rays which are formed after absorption of the photons 6 emanating from a beam 3 in the acicular crystals 7. These luminous rays are reflected at the sides of the needles 8 and emerge from the end of the needles. It can be seen that the size of the light source is reduced to a far greater extent in the case of the acicular monocrystals than in the case of the large monocrystals shown in FIG. 2, and that this size substantially corresponds to that of the slot 4.

There is thus obtained a luminescent screen of high intrinsic resolution which may be used in the construction of an X-ray image intensifier tube having a high resolution limit and a high contrast.

This increase in resolution enables the terms of the compromise between thickness and resolution referred to above to be modified. In other words, for a given resolution, it is possible for example considerably to increase the thickness of the layer which further increases the X-photon/luminous photon conversion rate.

FIG. 4 shows curves representing the variations in the modulation transfer function (MTF) with the spatial frequency expressed in pairs of lines per millimeter (PLM). The curve 11 relates to a layer of needles according to the invention, while curve 12 relates to a layer corresponding to the prior art. It can be seen for example that, for a spatial frequency of four pairs of lines per millimeter, the corresponding transfer function is approximately twice what it would have been with an ordinary layer.

FIG. 5 diagrammatically illustrates an apparatus which may be used for forming this layer of needles. A carousel 13 disposed in a vacuum chamber 14 supports a substrate capable of alternately occupying two positions 16 and 17. This substrate, on which the deposits are to be formed, is made of materials that are permeable to X-rays, for example aluminium. It is in the form of a spherical cap, the deposits having to be made on the concave part. This substrate is rotated about its own axis in addition to being rotated about the axis of the carousel, as indicated by the arrows. Two evaporation crucibles 18 and 19 respectively contain cesium iodide doped with sodium and the foreign material intended to be introduced into the crystal lattice of the cesium iodide.

This material has to be able to prevent the phenomenon of atomic diffusion of iodine and cesium which occurs at the interface of the needles during the heat treatment, whilst at the same time to prevent inhibiting of sodium luminescence in the cesium iodide matrix.

After extensive research, it was found that a certain number of materials are suitable. For example, certain oxide such as $SiO_2$, $Si_2O_3$, $Al_2O_3$, $SnO_2$, and more generally, as concerns silicon, $SiO_x$ with $1 \leq x \leq 2$.

The following procedure is then adopted:

The evaporation crucibles 18 and 19 respectively containing cesium iodide doped with sodium and the foreign material, $SiO_x$, are placed in the vacuum chamber 14. The substrate is placed cold on the carousel 13. Rotation of the carousel brings the substrate alternately over the crucibles 18 and 19. The cesium iodide and silicium oxide are then evaporated. The evaporation rate of the cesium iodide is regulated in such a way as to obtain a deposit on the substrate of approximately 5 $\mu$m/mn. This rate corresponds to the formation of needles approximately 5 $\mu$m in diameter which is an acceptable dimension from the optical point of view. The evaporation rate of the silicon oxide is regulated in such a way that the total quantity of this material introduced into the cesium iodide lattice is much less than 1% in weight. A smaller quantity would reduce the optical qualities while a larger quantity would result in an excessive loss of luminescence. After evaporation and deposition, the structure obtained is that shown in FIG. 3. The assembly as a whole is then subjected to heat treatment by increasing the temperature to between 250° and 500° C. for a period of 30 minutes. It was found that the structure is not altered to any significant extent during this treatment by virtue of the presence of silicium oxide in the cesium iodide lattice.

A variant of the structure thus produced is illustrated in FIG. 6 which shows the needles 7 deposited onto the substrate 2 under the conditions described above. In this variant, however, the substrate was left exposed after deposition to the vapours of cesium iodide alone so as to obtain the deposition of an additional layer 21 having a thickness of from 3 to 8 $\mu$m. This layer becomes homogeneous during the subsequent heat treatment.

This homogenisation produces a slight reduction in resolution, although it is negligible by virtue of the narrow thickness of the homogeneous layer. By contrast, it has the advantages of providing the luminescent layer with a smooth surface and of enabling a photocathode to be produced without any electrical interruptions over the entire surface of the screen.

What we claim is:

1. A scintillator screen for an X-ray image intensifier consisting of a scintillator screen with which a photocathode is associated, an electron-optical system, and an output screen on which the visible image appears, wherein the scintillator is formed by a substrate on which is vapor condensation and separately deposited a composite layer of cesium iodide doped with sodium and a different material consisting of an oxide introduced into the crystal lattice of the cesium iodide, said layer having thereby a structure of fine needles that are substantially parallel to and optically independent from one another.

2. A screen as claimed in claim 1, wherein the different material introduced into the crystal lattice of the scintillator is silicon oxide according to the formula $SiO_x$ with $1 \leq x < 2$.

3. A screen as claimed in claim 1, wherein the needles of the scintillator are between 3 and 8 micrometers in diameter.

4. A screen as claimed in claim 1, wherein the layer formed by the structure of fine needles is covered with a substantially homogeneous layer of cesium iodide.

5. A screen as claimed in claim 4, wherein the substantially homogeneous layer of cesium iodide has a thickness of from 3 to 8 micrometers.

6. A scintillator screen for an X-ray image intensifier having a photocathode, an electron-optical system, and output screen on which the visible image appears, wherein the scintillator screen comprises a substrate on which is vapor condensation deposited a composite layer of cesium iodide doped with sodium and a different material consisting of an oxide introduced into the crystal lattice of the cesium iodide for preventing the needles from coalescing into monocrystals of larger dimension during heating of the scintillator, said layer having thereby a structure of fine needles that are substantially parallel to and optically independent from one another and approximately 3 to 8 micrometers in diameter and wherein the different material introduced into the crystal lattice of the scintillator is silicon oxide according to the formula $SiO_x$ with $1 \leq x \leq 2$, and the total quantity of said different material is less than 1% by weight of the cesium iodide.

7. A scintillator screen according to claim 6 wherein said needles are approximately 100 to 200 micrometers in length.

8. A scintillator screen according to claim 6 wherein the layer formed by the structure of fine needles is covered by a substantially homogeneous layer of cesium oxide having a thickness of from 3 to 8 micrometers and smooth.

9. A scintillator screen for an X-ray image intensifier having a scintillator screen an associated photocathode, electron-optical system and output screen on which the visible image appears, wherein the scintillator is formed by a substrate on which is alternately vapor condensation deposited, this substrate being cold, cesium iodide doped with sodium and a different material consisting of an oxide introduced into the crystal lattice of the cesium iodide, the layer deposited on the substrate having thereby a structure of fine needles that are substantially parallel to and optically independent from one another.

10. A scintillator screen for an X-ray image intensifier having an associated photocathode, electron-optical system and output screen on which the visible image appears, wherein the scintillator screen comprises a substrate on which is alternately vapor condensation deposited, this substrate being cold, cesium iodide doped with sodium and a different material consisting of an oxide introduced into the crystal lattice of the cesium iodide for preventing the needles from coalescing into monocrystals of larger dimension during heating of the scintillator, the layer deposited on the substrate having thereby a structure of fine needles that are substantially parallel to and optically independent form one another and approximately 3 to 8 micrometers in diameter and approximately 100 to 200 micrometers in length, and wherein the different material introduced into the crystal lattice of the scintillator is silicon oxide according to the formula $SiO_x$ with $1 \leq x \leq 2$, and the total quantity of said different material is less than 1% by weight of the cesium iodide.

* * * * *